Nov. 25, 1941.    H. T. FAUS    2,264,074
TEMPERATURE COMPENSATING RESISTOR
Original Filed March 23, 1939
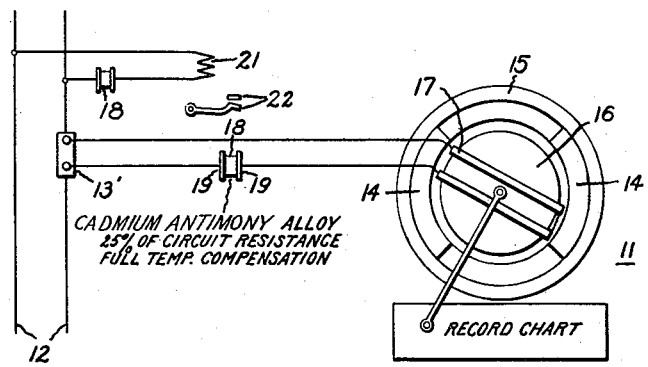
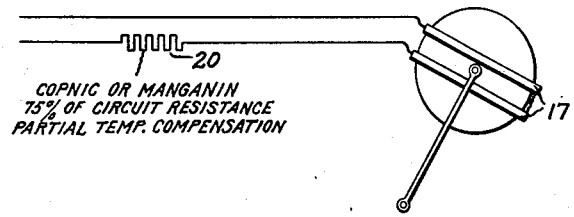
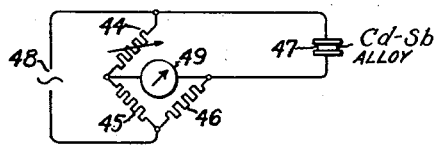    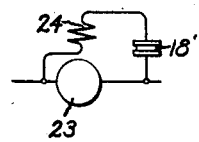
Inventor:
Harold T. Faus,
by Harry E. Dunham
His Attorney.

Patented Nov. 25, 1941

2,264,074

UNITED STATES PATENT OFFICE 2,264,074

TEMPERATURE COMPENSATING RESISTOR

Harold T. Faus, Lynn, Mass., assignor to General Electric Company, a corporation of New York Original application March 23, 1939, Serial No. 263,693. Divided and this application May 9, 1941, Serial No. 392,807

2 Claims. (Cl. 201—76)

This application is a division of my copending application, Serial No. 263,693, filed March 23, 1939, which is a division of my application, Serial No. 80,975, filed May 21, 1936, on which Patent No. 2,213,085 has been granted.

It is an object of my invention to provide electrical resistors and resistance elements having a negative temperature coefficient of resistance which is substantially uniform throughout a long range of temperatures.

Another object of my invention is to provide a highly sensitive resistance type thermometer.

My invention relates likewise to negative temperature coefficient of resistance materials and methods of making them. Other and further objects and advantages will become apparent as the description proceeds.

In accordance with my invention in its preferred form, in compensating a current-conducting device for the rise in resistance which occurs therein with increasing temperature, I connect a compensating resistor in series with the device to be compensated and I utilize a compensating resistor having a substantially linear negative coefficient of resistance exceeding in numerical value the positive temperature coefficient of resistance of the device to be compensated. For current-responsive devices, the compensating resistor is preferably one having a temperature coefficient at least substantially three times that of the device compensated so that only a fraction of the total resistance loss occurs in the compensating resistor and the sensitivity of the device is not greatly impaired by the addition of the temperature compensation.

The invention will be understood more readily from the following detailed description when considered in connection with the accompanying drawing and those features of the invention which are believed to be novel and patentable will be pointed out in the claims appended hereto. In the drawing, Fig. 1 is a circuit diagram schematically representing an embodiment of my invention as applied to measuring instruments or relays; Fig. 2 is a fragmentary circuit diagram of an instrument employing the conventional temperature compensation. Fig. 3 is a circuit diagram of another embodiment of my invention serving as a resistance thermometer; Fig. 4 is a circuit diagram of another embodiment of my invention applied to temperature compensation of motor speed.

Like reference characters are utilized in the drawing to designate like parts throughout. In Fig. 1, there is shown a recording instrument 11 arranged to measure the current in an electric circuit 12. A shunt 13 carries the current to be measured and the instrument 11, which is really a millivoltmeter, is connected across the shunt 13 to deflect in accordance with the voltage drop in the shunt.

For the sake of compactness, the instrument 11 has a field structure of the type disclosed in my Patent No. 1,985,082 with radially-magnetized annular-segment permanent magnets 14, a keeper 15 of magnetic material surrounding the permanent magnets and a soft iron core 16, or the field structure may be of the type having an internal permanent magnet as disclosed in Patent No. 1,920,764, Nickle. Such field constructions are not especially well adapted to temperature compensation by means of variable permeability elements shunting the air gap, and temperature compensation is ordinarily better accomplished by suitable means in the electrical circuit.

The movable element of the instrument 11 comprises a winding 17 carried on suitable pivots (not shown). Such windings are customarily composed of copper, which has a relatively high conductivity. The resistance of copper, however, as well as that of other known materials suitable for movable instrument windings, has a positive temperature coefficient of resistance, causing the calibration of the instrument to vary with temperature. In order to overcome the temperature error without greatly reducing the sensitivity of the instrument, I connect in series with the winding 17 a compensating resistor 18 having a negative temperature coefficient of resistance approximately equal in numerical value to three times the temperature coefficient of resistance of copper, and having a resistance at the average temperature of the instrument of approximately one-third the resistance of the winding 17.

One form of the high negative temperature coefficient compensating resistor 18 is composed of an alloy containing equal atomic proportions of cadmium and antimony cast into rods. Since the atomic weights of cadmium and antimony are approximately 112 and 122, respectively, the alloy contains approximately 11 parts cadmium and 12 parts antimony by weight.

The most convenient method of casting the alloy into resistors is to draw the molten alloy into glass tubes by means of a partial vacuum. After it has solidified in the tube, it may sometimes be pushed out in lengths of several inches without breaking. In order to stabilize the temperature-resistivity curve of the alloy, it is subjected to a simple annealing treatment.

Good electrical connections may be made to this alloy by electroplating with nickel or cobalt and soldering to the plated surface. If desired, copper terminals 19 may be soldered to the plated alloy resistor 18.

As the temperature coefficient of resistance of copper is approximately .4 per cent per degree C. and my compensating resistor has a temperature coefficient of resistance of over 1.2 per cent per degree C., but negative, it is apparent that the numerical value of the temperature coefficient of resistance of my compensating resistor is at least three times that of copper. Consequently, a compensating resistor having a resistance at average ambient temperature of only one-third the resistance of an instrument winding serves to provide complete temperature compensation of the instrument for resistance variations. The compensating resistor constitutes but twenty-five per cent of the circuit resistance of the instrument and reduces its sensitivity but twenty-five per cent.

On the other hand, if a substantially zero temperature coefficient of resistance series resistor is used for compensation in accordance with known practice, the sensitivity is reduced in the same ratio as the temperature error. For example, in order to make the overall temperature coefficient of resistance .1 instead of .4 reducing the temperature error to a fourth, it is necessary to connect in series a zero temperature coefficient of resistance resistor 20 (Fig. 2) having three times the resistance of the winding. There is a loss of seventy-five per cent of the available voltage. Inasmuch as the voltage available from a current shunt is limited, it will be apparent that twenty-five per cent of the available voltage will be insufficient to produce the torque required in a recording instrument.

Obviously, the invention is not limited to recording instruments but includes current-conducting devices of various types subject to temperature error. For example, a relay 21, connected across the source 12, may be caused to operate its contacts 22 accurately at the same voltage regardless of temperature conditions by connecting in series with the relay a negative temperature coefficient of resistance resistor 18' having such resistance as to compensate for variations in impedance of the winding of the relay 21.

Under certain circumstances a negative temperature coefficient of as much as 1.3 per cent per degree C. may not be desired. For such circumstances, I may reduce the temperature coefficient in one or more of several ways. I may reduce the annealing temperature or the annealing time or I may vary the percentages of the ingredients from equal atomic proportions, which I find gives substantially the maximum coefficient. The difference in proportions of antimony and cadmium is preferably not substantially more than 30 per cent if linearity is desired.

As illustrated in Fig. 4, the tendency of a shunt-wound motor 23 or a separately excited meter to vary in speed owing to variations in field current with temperature variations in field resistance or impedance may be overcome by connecting a negative temperature coefficient of resistance resistor 18' in series with the field or exciting winding 24.

In carrying out my invention in connection with temperature measurement, a Wheatstone bridge may be employed as illustrated in Fig. 3 comprising resistance arms 44, 45 and 46, one or more of which is adjustable, for example, the arm 44, a resistance arm 47 composed of high negative temperature coefficient of resistance material, a source of current 48, and a galvanometer 49, which will, of course, be a suitable alternating-current instrument or detector if the source 48 is alternating. The resistance arm 47 may be composed of heat-treated alloy such as described. The use of alternating current for guarding against any electrolysis of the resistor 47 is unnecessary in order to insure a high degree of constancy of its temperature-resistance curve. One of the other resistance arms, for example, the arm 46, may be of manganin or other suitable zero temperature coefficient of resistance material. Any effect of variations in ambient temperature on the resistances of the remaining two arms if made of like materials will be immaterial since their ratio will be unaffected. If desired, the arm 46 also may be of ordinary resistance material and its resistance variation may be allowed for in the calibrations. The arm 47 is placed at the point where the temperature is to be measured and the bridge is balanced by suitable adjustment of the variable resistance arm 44, which may be calibrated in degrees of temperature. If desired, the arms 47 and 46 may both be placed at the measured point. I have found that cadmium antimony alloy is substantially free from electrolysis effects.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An electrical resistance element composed of an alloy consisting principally of approximately 11 parts of cadmium and approximately 12 parts of antimony by weight.

2. A resistor comprising an alloy of substantially equal atomic proportions of cadmium and antimony.

HAROLD T. FAUS.